United States Patent
Kim et al.

(10) Patent No.: US 9,761,914 B2
(45) Date of Patent: Sep. 12, 2017

(54) BATTERY PACK

(71) Applicant: SAMSUNG SDI CO., LTD., Yongin-si, Gyeonggi-do (KR)

(72) Inventors: Jaemin Kim, Yongin-si (KR); Byungkook Ahn, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 258 days.

(21) Appl. No.: 14/560,396

(22) Filed: Dec. 4, 2014

(65) Prior Publication Data

US 2016/0043444 A1    Feb. 11, 2016

(30) Foreign Application Priority Data

Aug. 7, 2014  (KR) ........................ 10-2014-0101791

(51) Int. Cl.
*H01M 2/02*       (2006.01)
*H01M 10/42*      (2006.01)
(Continued)

(52) U.S. Cl.
CPC ....... *H01M 10/4257* (2013.01); *H01M 2/024* (2013.01); *H01M 2/0207* (2013.01);
(Continued)

(58) Field of Classification Search
None
See application file for complete search history.

(56) References Cited

U.S. PATENT DOCUMENTS 9,142,826 B1 *   9/2015  Wang ..................... H01M 2/34
2003/0146734 A1  8/2003  Kozu et al.
(Continued)

FOREIGN PATENT DOCUMENTS

EP    2 763 212 A1    8/2014
JP    2010-129413     6/2010
(Continued)

OTHER PUBLICATIONS

Extended European Search Report dated Jan. 19, 2016 in Corresponding European Patent Application No. 15162030.9.
(Continued)

*Primary Examiner* — Scott J Chmielecki
(74) *Attorney, Agent, or Firm* — Lee & Morse, P.C.

(57) ABSTRACT

A battery pack includes a plurality of unit batteries, each including a pair of first side surfaces and a pair of second side surfaces perpendicular to the pair of first side surfaces, the unit batteries being side-by-side in a first direction such that the pair of first side surfaces face each other. A protective circuit module including a substrate and protective devices mounted on the substrate is electrically connected to the unit batteries adjacent to top portions of the unit batteries. A first cap cover accommodates the protective circuit module and the top portions of the unit batteries. A second cap cover is spaced apart from the first cap cover with the unit batteries therebetween. The second cap cover accommodates bottom portions of the unit batteries. At least one of the first cap cover and the second cap cover includes a rib extending in a region between adjacent unit batteries.

15 Claims, 6 Drawing Sheets

(51) Int. Cl.
*H01M 2/10* (2006.01)
*H01M 10/04* (2006.01)
*H01M 2/20* (2006.01)

(52) U.S. Cl.
CPC ....... *H01M 2/0217* (2013.01); *H01M 2/1061* (2013.01); *H01M 10/425* (2013.01); *H01M 2/02* (2013.01); *H01M 2/0285* (2013.01); *H01M 2/204* (2013.01); *H01M 10/0436* (2013.01); *H01M 2010/4271* (2013.01); *H01M 2200/00* (2013.01); *H01M 2220/30* (2013.01)

(56) References Cited

U.S. PATENT DOCUMENTS

| | | | |
|---|---|---|---|
| 2009/0258285 A1 | 10/2009 | Kim | |
| 2013/0122329 A1* | 5/2013 | Park | H01M 2/0207 429/7 |
| 2014/0044995 A1* | 2/2014 | Moon | H01M 2/1022 429/7 |
| 2014/0065448 A1* | 3/2014 | Ahn | H01M 2/02 429/7 |
| 2014/0147707 A1* | 5/2014 | Choi | H01M 10/04 429/7 |
| 2014/0220423 A1* | 8/2014 | Yi | H01M 2/0237 429/163 |
| 2014/0220424 A1* | 8/2014 | Roh | H01M 2/30 429/179 |
| 2014/0302380 A1* | 10/2014 | Song | H01M 2/30 429/158 |
| 2015/0037619 A1* | 2/2015 | Ahn | H01M 10/42 429/7 |
| 2015/0364745 A1* | 12/2015 | Wang | H01M 2/348 429/7 |

FOREIGN PATENT DOCUMENTS

| | | |
|---|---|---|
| JP | 2010-153338 A | 7/2010 |
| JP | 2012-113973 A | 6/2012 |
| JP | 2012-128983 A | 7/2012 |
| JP | 2012-190586 | 10/2012 |
| KR | 2002-0087079 A | 11/2002 |
| KR | 10-2009-0108417 A | 10/2009 |
| KR | 10-2014-0021468 | 2/2014 |

OTHER PUBLICATIONS

Korean Office Action dated Oct. 7, 2015 in Corresponding Korean Patent Application No. 10-2014-0101791.
Korean Notice of Allowance dated Oct. 24, 2016 in Corresponding Korean Patent Application No. 10-2014-0101791.

* cited by examiner

BATTERY PACK

CROSS-REFERENCE TO RELATED APPLICATION

Korean Patent Application No. 10-2014-0101791, filed on Aug. 7, 2014, in the Korean Intellectual Property Office, and entitled: "Battery Pack," is incorporated by reference herein in its entirety.

BACKGROUND

1. Field

One or more embodiments relate to a battery pack.

2. Description of the Related Art

Along with the development of wireless internet and communication technology, the use of portable computers equipped with batteries instead of power supplies has become widespread. Portable computers are small, easy-to-carry, and optimized in mobility, and thus are widely used for business and personal use. A portable computers including an embedded battery pack may be used anywhere without being limited to places where power outlets are available. Such an embedded battery pack may include a rechargeable battery cell.

SUMMARY

Embodiments are directed to a battery pack including a plurality of unit batteries, each including a pair of first side surfaces and a pair of second side surfaces that are perpendicular to the pair of first side surfaces, the unit batteries being side-by-side in a first direction such that the pair of first side surfaces face each other, a protective circuit module electrically connected to the plurality of unit batteries, the protective circuit module including a substrate and protective devices mounted on the substrate, and the protective devices being adjacent to top portions of the plurality of unit batteries, a first cap cover accommodating the protective circuit module and the top portions of the plurality of unit batteries, and a second cap cover spaced apart from the first cap cover such that the plurality of unit batteries are therebetween, the second cap cover accommodating bottom portions of the plurality of unit batteries. At least one of the first cap cover and the second cap cover includes a rib extending in a region between adjacent unit batteries among the plurality of unit batteries.

The first cap cover may include a top plate corresponding to top surfaces of the plurality of unit batteries and first and second skirt portions that are perpendicular to the top plate and are parallel to each other.

The first cap cover may include a first rib supporting one side surface of the protective circuit module and extending in the region between the adjacent unit batteries. One side portion of the first rib may be integral with the second skirt portion and another side portion thereof may be spaced apart from an inner side surface of the first skirt portion.

The protective circuit module may be between another side portion of the first rib and the inner side surface of the first skirt portion.

One surface of the substrate of the protection circuit module, on which the protective devices are mounted, may face the inner side surface of the first skirt portion or the second skirt portion.

Ends of the first and second skirt portions may extend toward the pair of second side surfaces of the plurality of unit batteries to cover a part of the pair of second side surfaces of the plurality of unit batteries.

The second cap cover may include a bottom plate covering bottom surfaces of the unit batteries and third and fourth skirt portions that are perpendicular to the bottom plate and parallel to each other.

The second cap cover may include a second rib extending in the region between the adjacent unit batteries. The second rib may have a thickness that is substantially the same as a thickness of the plurality of unit batteries.

The second rib may include one side portion and another side portion disposed along a thickness direction of the plurality of unit batteries. At least one of widths of one side portion and the other side portion of the second rib may be greater than a width of a center portion of the second rib.

Both side surfaces of the second rib facing the pair of first side surfaces of the adjacent unit batteries may be in a form of a curved surface.

The battery pack may further include an insulating film attached to the pair of first side surfaces of one of the adjacent unit batteries.

A height of the rib may be less than 0.5 times a height of the plurality of unit batteries.

Each of the plurality of unit batteries may include a can including an opening, the can being made of a metallic material, an electrode assembly accommodated in the can, the electrode assembly including a first electrode plate, a second electrode plate, and a separator between the first and second electrode plates, a cap plate sealing the opening of the can, and an electrode pin disposed on the cap plate, the electrode pin having a different polarity from the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
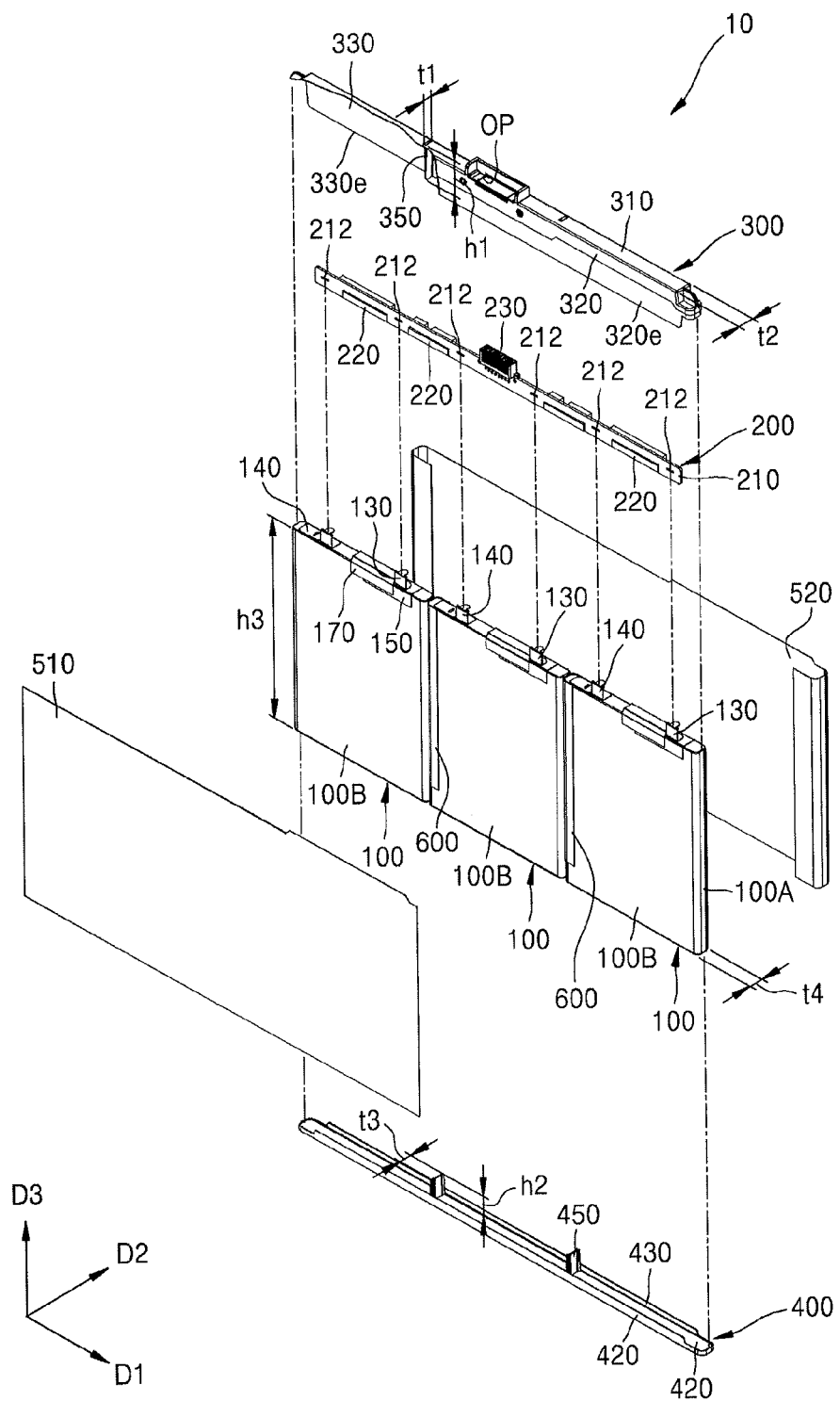
FIG. 1 illustrates an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when an element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

In the present specification, unless otherwise indicated, a first direction is a width direction, a second direction perpendicular to the first direction is a thickness direction, and a third direction perpendicular to the first and second directions is a height direction.

Figure 2:
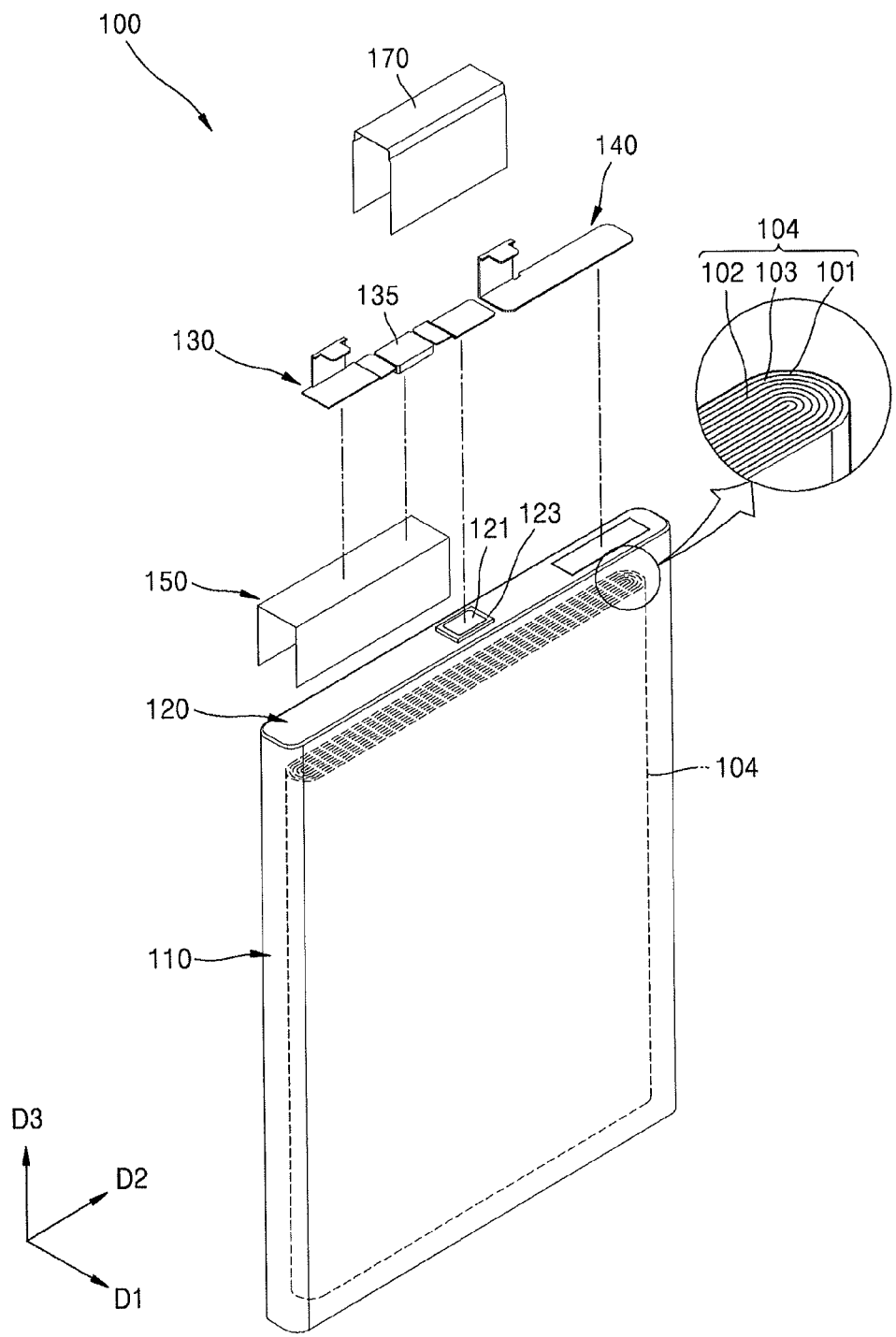
FIG. 2 illustrates a schematic perspective view of a unit battery according to an embodiment.
Figure 3:
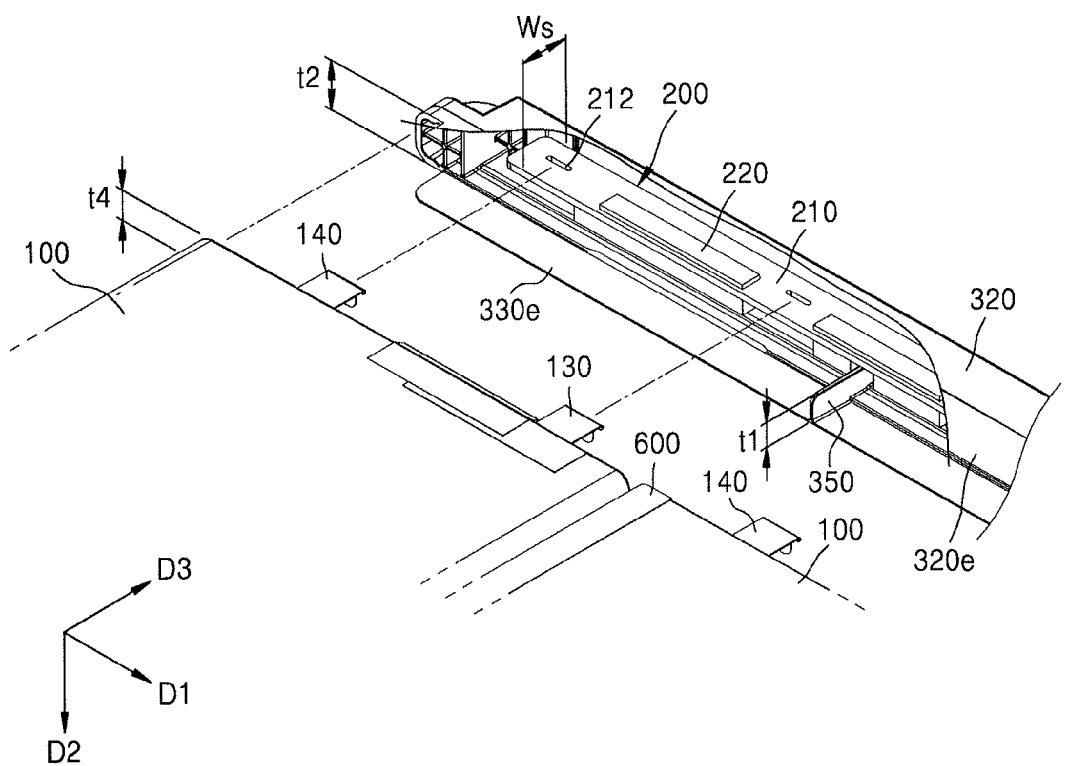
FIG. 3 illustrates a schematic perspective view of a first cap cover, a protection circuit module, and unit batteries included in the battery pack according to an embodiment.

FIG. 1 illustrates an exploded perspective view of a battery pack 10 according to an embodiment. FIG. 2 illustrates a schematic perspective view illustrating a unit battery 100 according to an embodiment. FIG. 3 illustrates a schematic perspective view of a first cap cover 300, a protective circuit module 200, and unit batteries 100 included in the battery pack 10 according to an embodiment. A part of a first skirt portion 320 of the first cap cover 300 is open in FIGS. 1 and 3 for convenience of illustration and description.

Referring to FIG. 1, the battery pack 10 of the embodiment may include a plurality of unit batteries 100, the protective circuit module 200, the first cap cover 300, a second cap cover 400, and labels 510 and 520.

The unit batteries 100 may be arranged side-by-side in a first direction such that sides of the unit batteries 100 face each other. For example, each of the unit batteries 100 may include a pair of first side surfaces 100A and a pair of second side surfaces 100B that are perpendicular to the pair of first side surfaces 100A and have areas greater than those of the first side surfaces 100A. The unit batteries 100 may be arranged in the first direction such that the first side surfaces 100A face each other. The unit batteries 100 may be rechargeable secondary battery cells such as lithium-ion battery cells, as examples.

The unit batteries 100 may have a prismatic shape. Referring to FIG. 2, each of the unit batteries 100 may include a can 110 having an opening, an electrode assembly 104 disposed in the can 110 through the opening, a cap plate 120 sealing the opening of the can 110, and an electrode pin 121 disposed on the cap plate 120.

The can 110 may have an approximately hexahedral shape with an opened one surface and may be formed of a metallic material so as to provide sufficient strength. For example, the can 110 may be formed of aluminum or an aluminum alloy. After the electrode assembly 104 is inserted into the can 110 through an opening, the opening may be sealed by the cap plate 120. Like the can 110, the cap plate 120 may be formed of a metallic material such as the aluminum or the aluminum alloy. Parts where the cap plate 120 and the can 110 contact with each other may be joined by laser welding, thereby maintaining sealing of the inside of the can 110.

The electrode assembly 104 may include a first electrode plate 101 and a second electrode plate 102 that are coated with an electrode active material, and a separator 103 disposed between the first and second electrode plates 101 and 102. The first and second electrode plates 101 and 102 have different polarities. The electrode assembly 104 may be formed by sequentially stacking the first electrode plate 101, the separator 103, and the second electrode plate 102, and winding them in the form of a jelly roll. In other implementations, the electrode assembly 104 may be in the form of a stack in which the first electrode plate 101, the separator 103, and the second electrode plate 102 are sequentially stacked.

The electrode pin 121 may be formed on the cap plate 120. The electrode pin 121 may protrude in a direction away from the cap plate 120.

The first electrode plate 101 may be electrically connected to the electrode pin 121, and the second electrode plate 102 may be electrically connected to the cap plate 120. the first and second electrode plates 101 and 102 may have different polarities. Accordingly, the electrode pin 121 and the cap plate 120 may have different polarities. For example, the electrode pin 121 may have a negative polarity, and the cap plate 120 may have a positive polarity. In this regard, a gasket 123 may be disposed between the electrode pin 121 and the cap plate 120 so as to prevent a short circuit therebetween.

A first terminal 130 and a second terminal 140 may be provided on the cap plate 120, and may electrically connect the unit battery 100 to the protective circuit module 200. As shown in FIG. 1, ends of the first and second terminals 130 and 140 may be inserted into and welded onto holes formed in the substrate 210 of the protective circuit module 200, such that the unit batteries 100 may be electrically connected to the protective circuit module 200.

The first terminal 130 may be electrically connected to the electrode pin 121, and the second terminal 140 may be electrically connected to the cap plate 120. The first and second terminals 130 and 140 have different polarities. For example, the first terminal 130 may have a negative polarity, and the second terminal 140 may have a positive polarity. The second terminal 140 provided on the cap plate 120 may have the same polarity as that of the cap plate 120, and thus no short circuit therebetween occurs. However, the first terminal 130 provided on the cap plate 120 may have a different polarity from that of the cap plate 120. To prevent a short circuit from occurring therebetween, an insulating tape 150 may be disposed between the first terminal 130 and the cap plate 120.

As described above, the cap plate 120 may be coupled to the can 110 by welding. Like the cap plate 120, the can 110 may be formed of a conductive metallic material. The can 110 may have the same polarity as the cap plate 120. The insulating tape 150 may be attached onto the cap plate 120 and a part of an outer surface of the can 110 to prevent the short circuit therebetween. The insulating tape 150 may be formed to have a wide surface to prevent the short circuit between the first terminal 130 and the cap plate 120 and the short circuit between the first terminal 130 and the outer surface of the can 110.

A fixing member 170 may cover the first terminal 130 so as to prevent a dislocation of the first terminal 130 provided on the cap plate 120.

Referring back to FIG. 1 again, the protective circuit module 200 may be provided to be adjacent to one side, for example, a top portion, of the unit batteries 100. For example, the protection circuit module 200 may be adjacent to the first and second terminals 130 and 140 that are provided on the top portion of each of the unit batteries 100.

The protective circuit module 200 may be electrically connected to the unit batteries 100 so as to control charging and discharging operations of the unit batteries 100 and prevent overheating and explosion caused by overcharging, overdischarging, or an overcurrent.

The protective circuit module 200 may include the substrate 210, protection devices 220 disposed on the substrate 210, and external terminals 230. The substrate 210 may extend in an arrangement direction (first direction D1) of the unit batteries 100. The protection devices 220 may include a safety device such as a passive device (e.g., a resistor or condenser) or an active device (e.g., a field electric transistor), or an integrated circuit.

The substrate 210 may include connection holes 212. The first and second terminals 130 and 140 included in each of the unit batteries 100 may be inserted into the connection holes 212 formed in the substrate 210 and may be soldered to the substrate 210. According to an embodiment, soldering may be performed on an opposite surface from one surface of the substrate 210 on which the protection devices 220 are mounted to prevent the protection devices 220 from being damaged due to heat generated by soldering.

The substrate 210 may include a circuit pattern through which the unit batteries 100 are connected in series, parallel, or series/parallel. An additional member for electrically connecting the unit batteries 100 may be omitted Thus, the number of parts may be reduced.

The first cap cover 300 may accommodate top portions of the unit batteries 100 and the protective circuit module 200. The first cap cover 300 may include a top plate 310 corresponding to the top surfaces of the unit batteries 100 and first and second skirt portions 320 and 330 that are perpendicular to the top plate 310 and are parallel to each other. When the protective circuit module 200 is inserted into the first cap cover 300, one surface of the substrate 210 on which the protection devices 220 are mounted may be disposed to face an inner surface of the first skirt portion 320 as shown in FIG. 3. In one embodiment, one surface of the substrate 210 on which the protection devices 220 are mounted faces the first skirt portion 320. In other implementations, the one surface of the substrate 210 on which the protection devices 220 are mounted may be provided to face an inner surface of the second skirt portion 330.

An opening OP may be formed in the top plate 310 such that an external terminal 230 provided in the protective circuit module 200 is exposed. The first and second skirt portions 320 and 330 may extend toward the unit batteries 100. An extending end 320e of the first skirt portion 320 and an extending end 330e of the second skirt portion 330 may extend toward second side surfaces 100B of the unit batteries 100 to cover a part of the second side surfaces 100B of the unit batteries 100.

The second cap cover 400 may be separate and spaced apart from the first cap cover 300. The second cap cover 400 may accommodate bottom portions of the unit batteries 100. The second cap cover 400 may include a bottom plate 410 that covers the bottom surfaces of the unit batteries 100 and third and fourth skirt portions 420 and 430 that are perpendicular to the bottom plate 410 and are parallel to each other. The third and fourth skirt portions 420 and 430 may extend toward the second side surfaces 100B of the unit batteries 100 to cover a part of the second side surfaces 100B of the unit batteries 100.

The labels 510 and 520 may be disposed between the first and second cap covers 300 and 400 and may cover the side surfaces of the unit batteries 100 exposed between the first and second cap covers 300 and 400. The labels 510 and 520 may be attached onto the end 320e of the first skirt portion 320 and the end 330e of the second skirt portion 330 of the first cap cover 300, the third and fourth skirt portions 420 and 430 of the second cap cover 400, and the side surfaces of the unit batteries 100 so as to at least partially surround the side surfaces.

As described above, the can 110 of the unit batteries 100 may include a metallic material, and may be welded to the cap plate 120. Thus, an exterior circumferential surface of the can 110 may have a polarity. For example, if the electrode pin 121 has a negative polarity, the can 110 may have a positive polarity. The can 110 of each of the unit batteries 100 may have the same polarity. To prevent a short circuit from occurring by first side surfaces of adjacent unit batteries 100 contacting each other, at least one of the first and second cap covers 300 and 400 may include ribs 350 and 450 disposed between the adjacent unit batteries 100.

Referring to FIGS. 1 and 3, the first cap cover 300 may include a first rib 350, and the second cap cover 400 may include a second rib 450. Each of the first and second ribs 350 and 360 may extend toward a region between the adjacent unit batteries 100.

The first rib 350 may be formed inside of the first cap cover 300 and may prevent a short circuit between the adjacent unit batteries 100 while supporting one side surface of the protective circuit module 200.

A thickness t1 of the first rib 350 may be smaller than a thickness t2 (or a distance between first and second skirt portions 420 and 430) of a first cap cover 300. For example, one side portion of the first rib 350 may be integrally formed with the second skirt portion 330 and may extend perpendicularly from the second skirt portion 330. Another side portion of the first rib 350 may be formed separate and spaced apart from the inner side surface of the first skirt portion 320 such that a space is formed between the other side portion of the first rib 350 and the inner side surface of the first skirt portion 320. The protective circuit module 200 may be inserted into and disposed in the space formed between the other side portion of the first rib 350 and an inner side surface of the first skirt portion 320.

One end of the first rib 350 may extend longer than a width $w_s$ of the substrate 210 of the protective circuit module 200, and may be disposed between the adjacent unit batteries 100. The end of the first rib 350 may prevent the first side surfaces 100A of the unit batteries 100 from contacting with each other.

Referring back to FIG. 1, the second cap cover 400 may include the second rib 450. The second rib 450 may extend in a direction perpendicular to the bottom plate 410 and may be disposed in the region between the adjacent unit batteries 100. The second rib 450 may prevent the first side surfaces 100A of the adjacent unit batteries 100 from contacting with each other. A thickness t3 of the second rib 450 may be substantially the same as a thickness t4 of the unit batteries 100.

Heights h1 and h2 of the first and second ribs 350 and 450, respectively, may be smaller than half of a height h3 of the unit batteries 100. The first and second ribs 350 and 450 that are separate and spaced apart from each other may cover a part of the first side surfaces 100A of the unit batteries 100.

An insulating film 600 may be attached onto one of the first side surfaces 100A of the adjacent unit batteries 100. Since the insulating film 600 is insulatingly attached onto one of the first side surfaces 100A of the adjacent unit batteries 100, a short circuit may be prevented.

Figure 4:
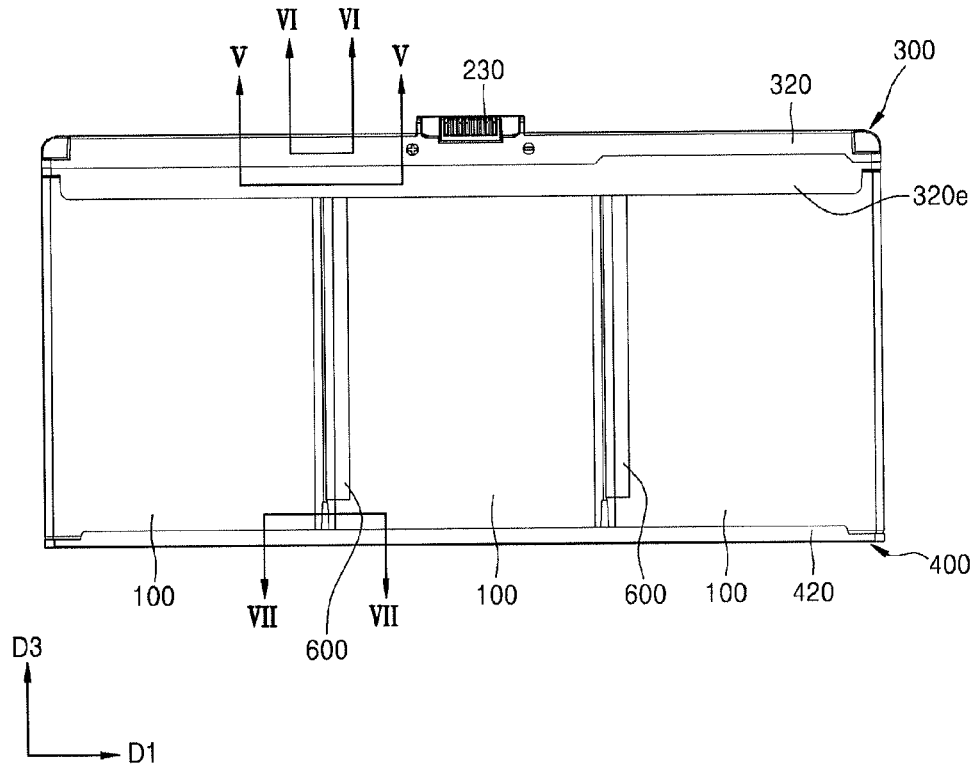
FIG. 4 illustrates a plan view of labels of the battery pack according to an embodiment.
Figure 5:
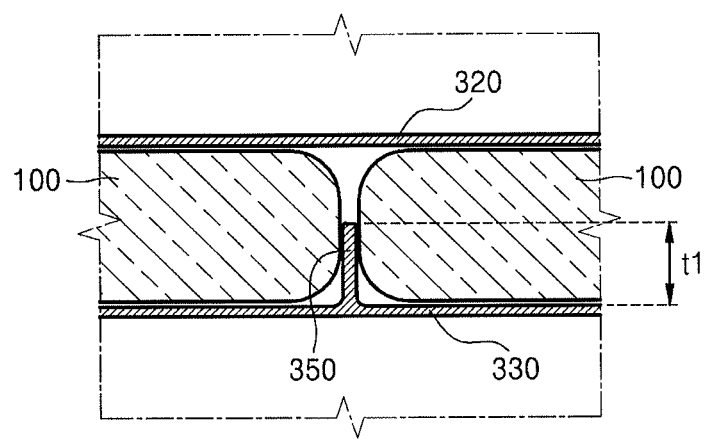
FIG. 5 illustrates a cross-sectional view taken along a line V-V of FIG. 4.
Figure 6:
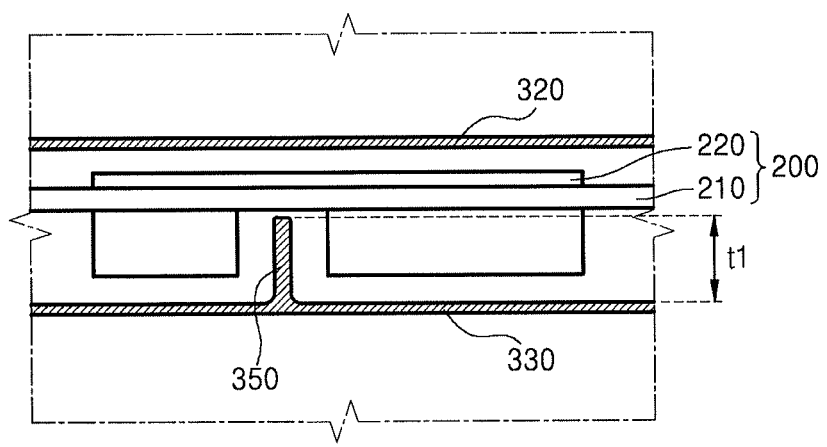
FIG. 6 illustrates a cross-sectional view taken along a line VI-VI of FIG. 4.
Figure 7:
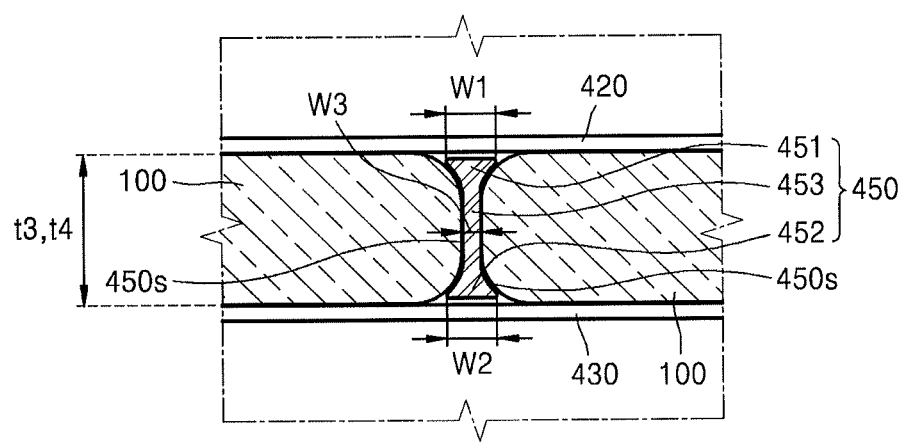
FIG. 7 illustrates a cross-sectional view taken along a line VII-VII of FIG. 4.

FIG. 4 illustrates a plan view of the battery pack 10 according to an embodiment. FIG. 5 illustrates a cross-sectional view taken along a line V-V of FIG. 4. FIG. 6 illustrates a cross-sectional view taken along a line VI-VI of FIG. 4. FIG. 7 illustrates a cross-sectional view taken along a line VII-VII of FIG. 4.

Referring to FIG. 4, the protective circuit module 200 and top portions of the unit batteries 100 may be accommodated in the first cap cover 300, and bottom portions of the unit batteries 100 may be accommodated in the second cap cover 400. The adjacent unit batteries 100 may be insulated from each other by the first and second ribs 350 and 450 that are respectively formed in the first and second cap covers 300 and 400, thereby preventing the adjacent unit batteries 100 from contacting and being short circuited.

An end of the first rib 350 may be disposed in a region between the adjacent unit batteries 100 as shown in FIG. 5. As shown in FIG. 6, the first rib 350 may be formed to have the thickness t1 smaller than the thickness of a first cap cover, i.e. a distance between the first and second skirt portions 320 and 330. One side portion of the first rib 350 may be integrally formed with the second skirt portion 330 and another side portion thereof may be separate and spaced apart from an inner side surface of the first skirt portion 320. The protective circuit module 200 may be disposed between the inner side surface of the first skirt portion 320 and the other side portion of the first rib 350.

Referring to FIG. 7, the second rib 450 may be disposed in a region between the adjacent unit batteries 100, and may have the thickness t3 that is substantially the same as a thickness t4 of the unit batteries 100. At least one of the widths w1 and w2 of one side portion 451 and another side portion 452 of the second rib 450 formed in a thickness direction may be greater than a width w3 of a center portion 453 of the second rib 450. Thus, the second rib 450 may have an I-beam shape cross-section.

Both side surfaces 450s of the second rib 450 may have a curved surface. The unit batteries 100 disposed at respective sides of the second rib 450 may have round corners. The second rib 450 may stably cover side surfaces of the adjacent unit batteries 100 and may prevent the unit batteries 100 from moving.

By way of summation and review, embodiments provide a battery pack that is easy to assemble and effectively prevents or reduces the likelihood of an undesirable electric short.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
    a plurality of unit batteries, each including a pair of first side surfaces and a pair of second side surfaces that are perpendicular to the pair of first side surfaces, the unit batteries being side-by-side in a first direction such that the pair of first side surfaces face each other;
    a protective circuit module electrically connected to the plurality of unit batteries, the protective circuit module including a substrate and protective devices mounted on the substrate, and the protective devices being adjacent to top portions of the plurality of unit batteries;
    a first cap cover accommodating the protective circuit module and the top portions of the plurality of unit batteries, wherein the first cap cover includes a top plate corresponding to top surfaces of the plurality of unit batteries; and
    a second cap cover spaced apart from the first cap cover such that the plurality of unit batteries are therebetween, the second cap cover accommodating bottom portions of the plurality of unit batteries, wherein the second cap cover includes a bottom plate covering the bottom portions of the plurality of unit batteries,
    wherein the first cap cover includes a first rib extending from the top plate into a region between adjacent unit batteries among the plurality of batteries, and the second cap cover includes a second rib extending from the bottom plate into another region between the adjacent unit batteries among the plurality of unit batteries.

2. The battery pack as claimed in claim 1, wherein the first cap cover includes first and second skirt portions that are perpendicular to the top plate and are parallel to each other.

3. The battery pack as claimed in claim 2, wherein:
    the first rib supports one side surface of the protective circuit module, and
    one side portion of the first rib is integral with the second skirt portion and another side portion thereof is spaced apart from an inner side surface of the first skirt portion.

4. The battery pack as claimed in claim 3, wherein the protective circuit module is between another side portion of the first rib and the inner side surface of the first skirt portion.

5. The battery pack as claimed in claim 4, wherein one surface of the substrate of the protection circuit module, on which the protective devices are mounted, faces the inner side surface of the first skirt portion or the second skirt portion.

6. The battery pack as claimed in claim 2, wherein ends of the first and second skirt portions extend toward the pair of second side surfaces of the plurality of unit batteries to cover a part of the pair of second side surfaces of the plurality of unit batteries.

7. The battery pack as claimed in claim 1, wherein the second cap cover includes third and fourth skirt portions that are perpendicular to the bottom plate and parallel to each other.

8. The battery pack as claimed in claim 1, wherein the second rib has a thickness that is substantially the same as a thickness of the plurality of unit batteries.

9. The battery pack as claimed in claim 8, wherein:
    the second rib includes one side portion and another side portion disposed along a thickness direction of the plurality of unit batteries, and
    at least one of widths of one side portion and the other side portion of the second rib is greater than a width of a center portion of the second rib.

10. The battery pack as claimed in claim 8, wherein both side surfaces of the second rib facing the pair of first side surfaces of the adjacent unit batteries are in a form of a curved surface.

11. The battery pack as claimed in claim 1, further comprising an insulating film attached to the pair of first side surfaces of one of the adjacent unit batteries.

12. The battery pack as claimed in claim 1, wherein a height of the rib is less than 0.5 times a height of the plurality of unit batteries.

13. The battery pack as claimed in claim 1, wherein each of the plurality of unit batteries includes:
    a can including an opening, the can being made of a metallic material;
    an electrode assembly accommodated in the can, the electrode assembly including a first electrode plate, a second electrode plate, and a separator between the first and second electrode plates;
    a cap plate sealing the opening of the can; and an electrode pin disposed on the cap plate, the electrode pin having a different polarity from the cap plate.

14. The battery pack as claimed in claim 1, wherein the second cap cover is spaced apart from the first cap cover with a gap between the first and second cap cover, the pair of second side surfaces of the plurality of unit batteries are exposed by the gap, and wherein at least one of the first rib and second rib contact each of the first side surface of neighboring unit batteries.

15. The battery pack as claimed in claim 1, wherein the first rib and the second rib are spaced apart from each other.

* * * * *